(12) United States Patent
Byun et al.

(10) Patent No.: US 7,643,242 B2
(45) Date of Patent: Jan. 5, 2010

(54) HARD DISK DRIVE ASSEMBLY, MOUNTING STRUCTURE FOR HARD DISK DRIVE, AND MOBILE PHONE ADOPTING THE MOUNTING STRUCTURE

(75) Inventors: Yong-kyu Byun, Yongin-si (KR); Min-pyo Hong, Suwon-si (KR); No-yeol Park, Seoul (KR); Byoung-gyou Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 586 days.

(21) Appl. No.: 11/153,327

(22) Filed: Jun. 16, 2005

(65) Prior Publication Data
US 2006/0050430 A1    Mar. 9, 2006

(30) Foreign Application Priority Data
Sep. 7, 2004    (KR) .................... 10-2004-0071227

(51) Int. Cl.
G11B 33/14    (2006.01)
H04M 1/00    (2006.01)
(52) U.S. Cl. ................................. 360/97.02; 455/575.1
(58) Field of Classification Search .............. 360/97.02; 455/410, 575.1
See application file for complete search history.

(56) References Cited

U.S. PATENT DOCUMENTS

| | | | | |
|---|---|---|---|---|
| 4,639,863 A | * | 1/1987 | Harrison et al. | 360/97.01 |
| 5,396,384 A | * | 3/1995 | Caldeira et al. | 360/98.01 |
| 5,420,733 A | * | 5/1995 | Knighton et al. | 360/97.01 |
| 5,500,779 A | * | 3/1996 | Diel | 360/97.01 |
| 5,508,860 A | * | 4/1996 | Takagi et al. | 360/97.01 |
| 5,717,541 A | * | 2/1998 | Ycas et al. | 360/97.01 |
| 5,822,152 A | * | 10/1998 | Seaver et al. | 360/99.08 |
| 5,827,090 A | * | 10/1998 | Knighton | 439/571 |
| 6,288,866 B1 | * | 9/2001 | Butler et al. | 360/97.01 |
| 2003/0086214 A1 | * | 5/2003 | Shin | 360/266.3 |
| 2006/0098332 A1 | * | 5/2006 | Lee et al. | 360/97.02 |

FOREIGN PATENT DOCUMENTS

| | | |
|---|---|---|
| CN | 2550977 Y | 5/2003 |
| CN | 2590057 Y | 12/2003 |
| KR | 2000-0052170 A | 8/2000 |
| KR | 10-2004-0048891 A | 6/2004 |

* cited by examiner

*Primary Examiner*—Brian E Miller
(74) *Attorney, Agent, or Firm*—Sughrue Mion, PLLC (57) ABSTRACT

Provided is a hard disk drive (HDD) assembly. The HDD assembly includes: a HDD including a base member, a cover member, a spindle motor, a data storage disk, and an actuator; and a printed circuit board (PCB) disposed beside the HDD and operating the HDD. The HDD assembly can be mounted on an electronic device, for example, a mobile phone. In this case, the HDD assembly is mounted between a main PCB and a back cover of the mobile phone using a first damping pad interposed between the cover member and the main PCB and a second damping pad interposed between the base member and the back cover. The PCB for the HDD is disposed on the main PCB of the mobile phone to be placed beside the HDD.

11 Claims, 7 Drawing Sheets

HARD DISK DRIVE ASSEMBLY, MOUNTING STRUCTURE FOR HARD DISK DRIVE, AND MOBILE PHONE ADOPTING THE MOUNTING STRUCTURE

This application claims the priority of Korean Patent Application No. 10-2004-0071227, filed on Sep. 7, 2004, in the Korean Intellectual Property Office, the disclosure of which is incorporated herein in its entirety by reference.

BACKGROUND OF THE INVENTION

1. Field of the Invention

The present invention relates to a small hard disk drive (HDD) assembly, a mounting structure for mounting the small HDD assembly inside an electronic device, and a mobile phone adopting the mounting structure.

2. Description of the Related Art

Hard disk drives (HDDs), which are information storage devices, reproduce data stored in a disk or record data on the disk using a read/write head. In such HDDs, the read/write head functions by being moved to a desired position by an actuator while being lifted a predetermined height above a recording surface of the rotating disk.

Recently, as portable electronic devices, such as mobile phones, personal digital assistants (PDAs), camcorders, and MP3 players, are required to have a higher performance, HDDs capable of storing a greater amount of information are employed in the portable electronic devices. Portable electronic devices are required to be lighter, thinner, and smaller, as well as have a higher performance. Accordingly, small-sized HDDs using a disk with a very small diameter, for example, a diameter of 1 or 0.85 inches, are generally employed in those portable electronic devices.

Figure 1:
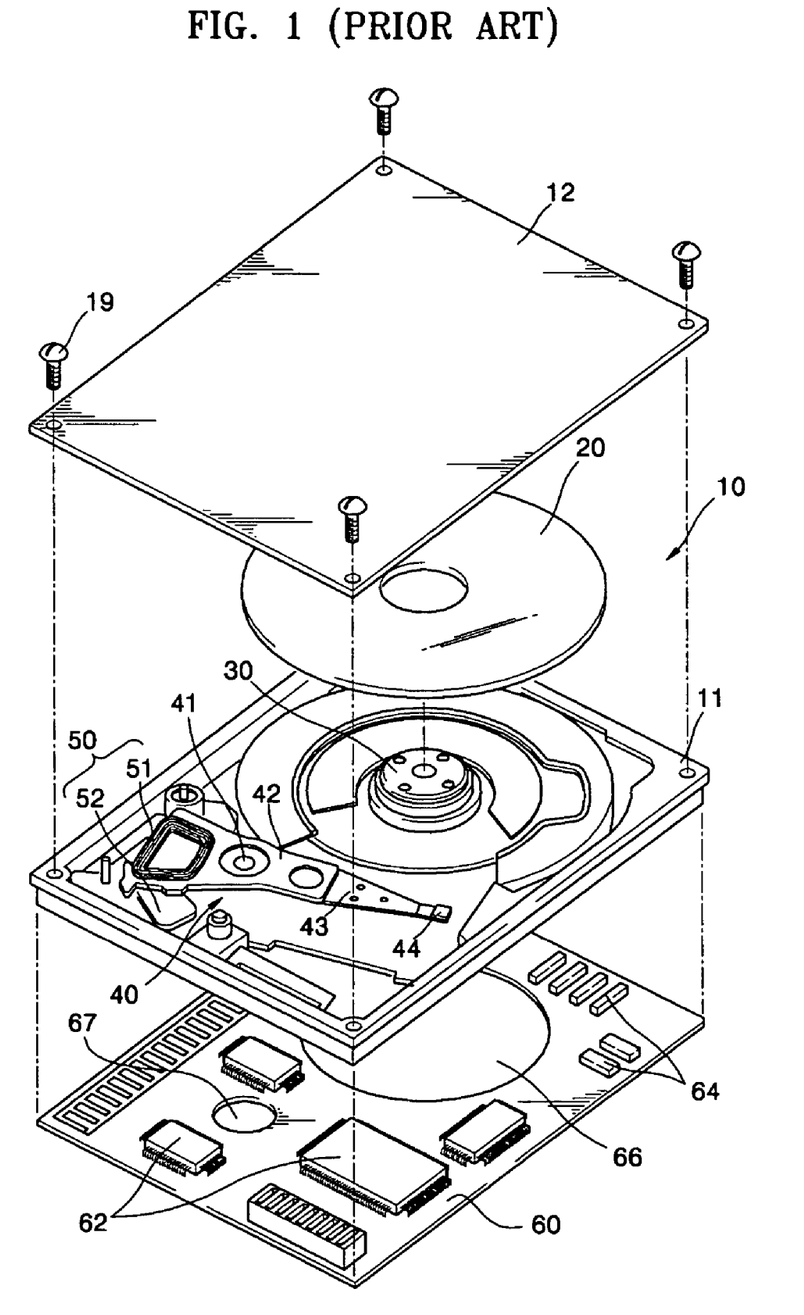
FIG. 1 is an exploded perspective view of a conventional small hard disk drive (HDD)
Figure 2:
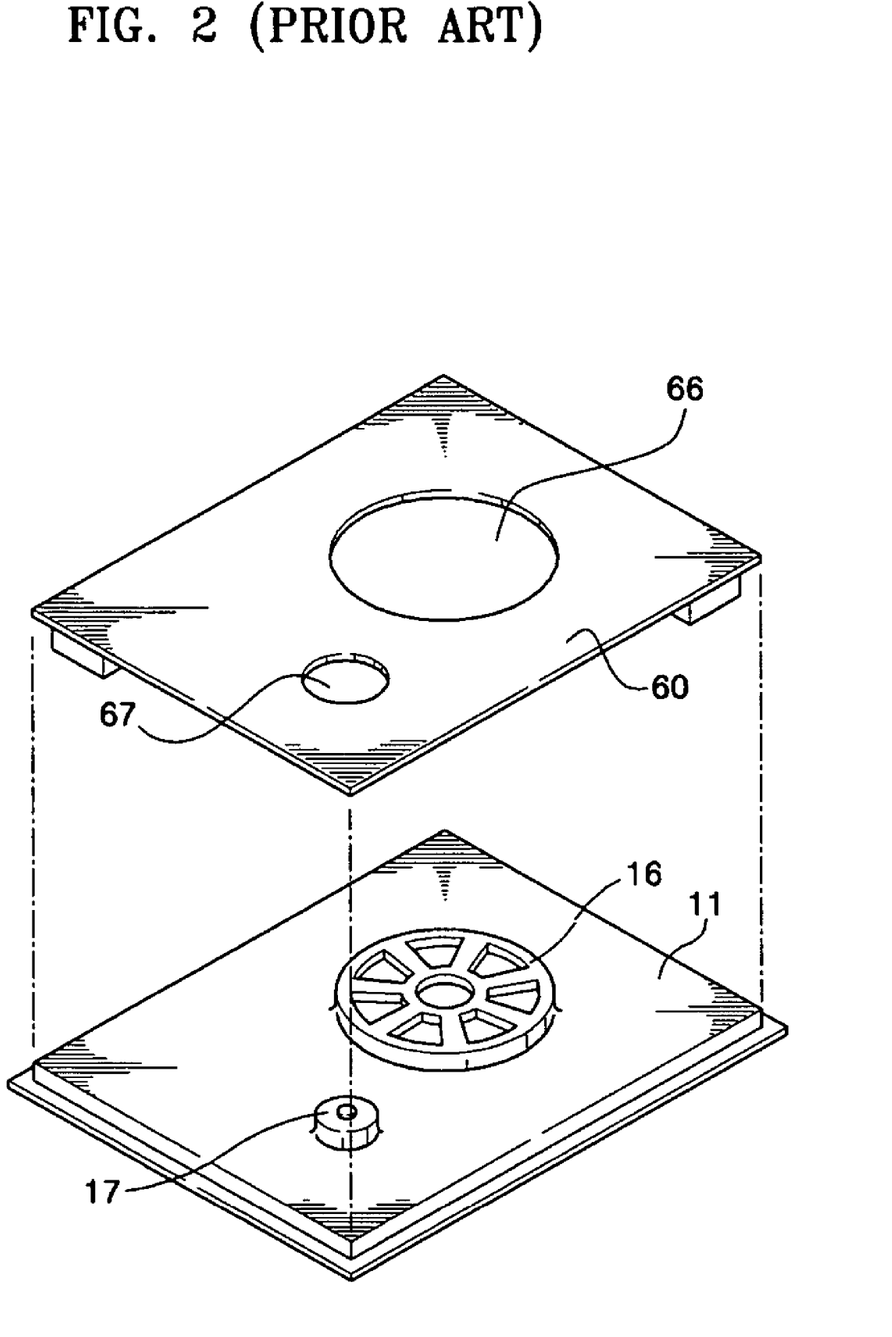
FIG. 2 is a perspective view of the conventional small HDD shown in FIG. 1, which is overturned.

FIG. 1 is an exploded perspective view of a conventional small HDD. FIG. 2 is a perspective view of the conventional small HDD shown in FIG. 1, which is overturned.

Referring to FIGS. 1 and 2, a HDD 10 includes a base member 11 and a cover member 12 coupled to the base member 11 using a plurality of screws 19. The base member 11 supports a spindle motor 30 for rotating a disk 20 and an actuator 40 for moving a read/write head 44 to a desired position on the disk 20.

The actuator 40 includes a swing arm 42, which is rotatably coupled to an actuator pivot 41 that is installed on the base member 11, and a suspension 43, which is installed on an end portion of the swing arm 42 and elastically biases the read/write head 44 toward a surface of the disk 20. The actuator 40 includes a voice coil motor (VCM) 50 for rotating the swing arm 42. The VCM 50 includes a VCM coil 51, which is coupled to the other end portion of the swing arm 42, and a magnet 52, which is installed on the base member 11 to face the VCM coil 51. The VCM 50 is controlled by a servo control system, and rotates the swing arm 42 in a direction according to Fleming's Left Hand Rule due to an interaction between current input the VCM coil 51 and a magnetic field formed by the magnet 52.

A printed circuit board (PCB) 60 is disposed under the base member 11. The PCB 60 supports semiconductor chips 62 for operating the actuator 40, the read/write head 44, and the spindle motor 30, and various circuit elements 64.

In the meantime, as shown in FIG. 2, a motor support portion 16 for supporting the spindle motor 30 and a pivot support portion 17 for supporting the actuator pivot 41 protrude a predetermined height from a bottom surface of the base member 11. Insertion holes 66 and 67 into which the motor support portion 16 and the pivot support portion 17 are respectively inserted are formed in the PCB 60.

In the conventional small HDD 10, since the many semiconductor chips 62 and circuit elements 64 are mounted on the PCB 60, the insertion holes 66 and 67 should be as small as possible in order to secure sufficient areas for the semiconductor chips 62 and circuit elements 64. Accordingly, the motor support portion 16 for supporting the spindle motor 30 should be as small in diameter as possible, and thus, the spindle motor 30 employed in the small HDD 10 is also limited in size.

For example, for a conventional 0.85-inch diameter HDD, a spindle motor having a diameter of $\phi 17.6$ mm is generally used for that reason. Such a small spindle motor has disadvantages of a relatively low rotational stiffness Kt of 1.05 to 1.2 and a relatively high power consumption of approximately 57 mW. Additionally, in this case, it is not easy to start the motor at a low temperature.

Figure 3:
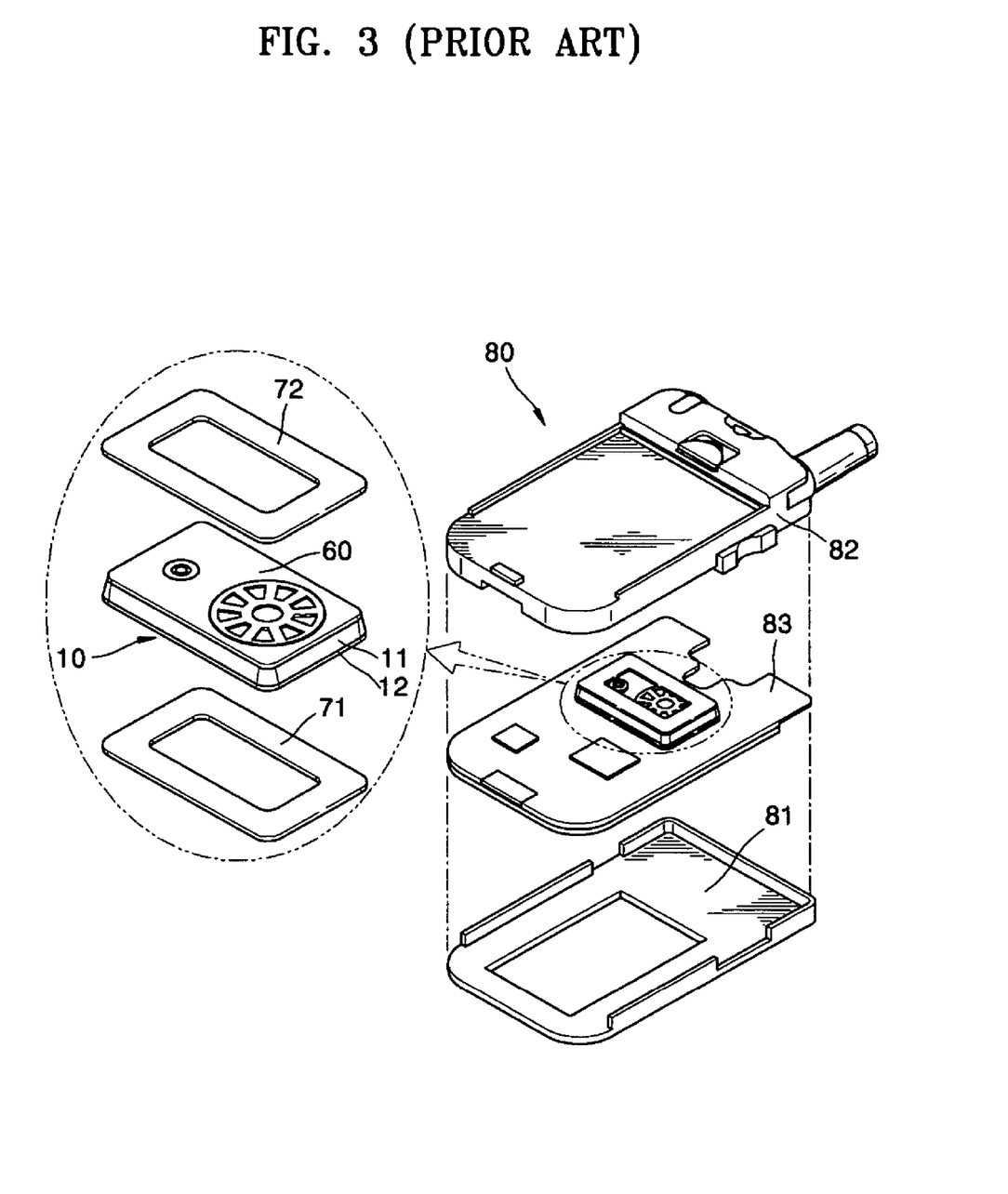
FIG. 3 is an exploded perspective view of an electronic device, for example, a mobile phone, on which the conventional small HDD shown in FIG. 1 is mounted.
Figure 4:
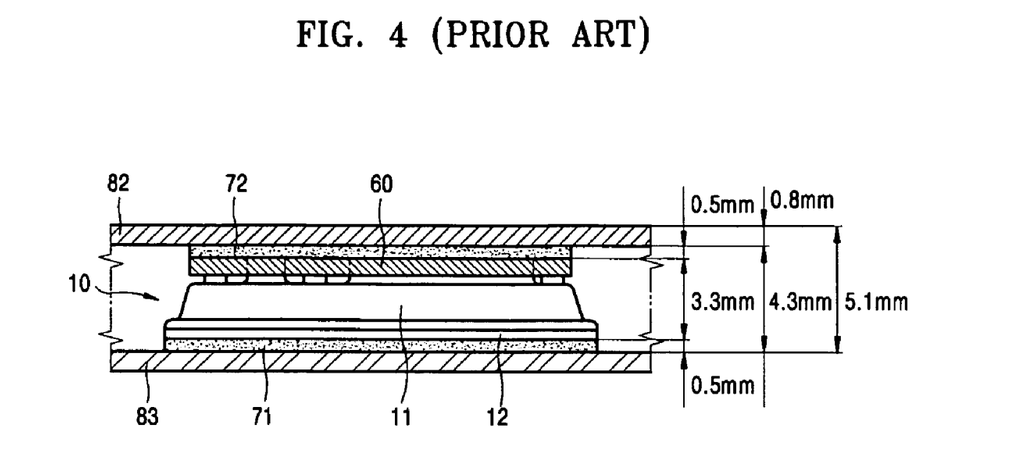
FIG. 4 is a vertical sectional view of the mobile phone on which the conventional small HDD is mounted shown in FIG. 3.

FIG. 3 is an exploded perspective view of a portable electronic device, such as a mobile phone, on which the conventional small HDD shown in FIG. 1 is mounted. FIG. 4 is a vertical sectional view of the phone on which the conventional small HDD is mounted shown in FIG. 3.

Referring to FIG. 3, the small HDD 10 constructed as above can be mounted inside an electronic device, for example, a mobile phone 80. Specifically, the HDD 10 is mounted on a mobile phone main PCB 83 installed between a front cover 81 and a back cover 82 of the mobile phone 80. Here, damping pads 71 and 72 are interposed between the cover member 12 of the HDD 10 and the mobile phone main PCB 83 and between the PCB 60 of the HDD 10 and the back cover 82, respectively. The damping pads 71 and 72 prevent external shocks and vibrations applied to the mobile phone 80 from being transferred to the HDD 10.

Referring to FIG. 4, when the HDD 10 is mounted on the mobile phone 80, the total thickness of the mobile phone 80 is relatively high. For example, it is assumed that the 0.85-inch diameter HDD 10 is mounted on the mobile phone 80. As shown in FIG. 4, when the thickness of the 0.85-inch diameter HDD 10 including the PCB 60 is 3.3 mm and the thickness of each of the damping pads 71 and 72 is 0.5 mm, the sum of the thickness of the HDD 10 and the thicknesses of the damping pads 71 and 72 is approximately 4.3 mm. If the thickness of the back cover 82, that is, 0.8 mm, is added to the sum, the total thickness of the HDD 10, the damping pads 71 and 72, and the back cover 82 is 5.1 mm.

As described above, when small HDDs are mounted on portable electronic devices, such as mobile phones, the thickness of the portable electronic devices increases, which is not consistent with the recent trend toward lighter, thinner, and smaller portable electronic devices.

Accordingly, there are demands to minimize a thickness increment of electronic devices employing HDDs by improving mounting structures of the HDDs.

SUMMARY OF THE INVENTION

The present invention provides a small hard disk drive assembly having a separated printed circuit board to minimize a thickness increment of an electronic device.

The present invention also provides a mounting structure for mounting the hard disk drive assembly on an electronic device.

The present invention also provides a mobile phone on which the hard disk drive assembly is mounted.

Consistent with an aspect of the present invention, there is provided a hard disk drive assembly comprising: a hard disk drive including a base member, a cover member, a spindle motor installed on the base member, at least one data storage disk mounted on the spindle motor, and an actuator pivotably installed on the base member and moving a read/write head to a predetermined position on the disk; and a printed circuit board disposed beside the hard disk drive and operating the hard disk drive.

The printed circuit board may be disposed on the same plane as the hard disk drive. The printed circuit board may be electrically connected to the hard disk drive using at least one flexible printed circuit.

The printed circuit board may support a mating socket that electrically connects the printed circuit board to an electronic device on which the hard disk drive is mounted.

Consistent with another aspect of the present invention, there is provided a mounting structure for mounting a hard disk drive including a cover member and a base member inside an electronic device including a first member and a second member, which face each other, the mounting structure comprising: a first damping pad interposed between the cover member and the first member; and a second damping pad interposed between the base member and the second member, wherein the hard disk drive is mounted between the first member and the second member using the first damping pad and the second damping pad, a printed circuit board for operating the hard disk drive is disposed on the first member to be placed beside the hard disk drive.

The first damping pad may have a substantially rectangular frame shape contacting edges of the cover member of the hard disk drive, or have a substantially rectangular plate shape contacting the overall surface of the cover member of the hard disk drive.

The second damping pad may contact a surface of the base member other than protrusions formed on the base member. A surface of the second damping pad contacting the surface of the base member may conform with the curved surface of the base member.

The second member may have a through-hole into which the protrusions of the base member are inserted. The protrusions may comprise a motor support portion, which supports a spindle motor of the hard disk drive, and a pivot support portion, which supports an actuator pivot of the hard disk drive.

The first damping pad and the second damping pad may be made of viscoelastic material.

The first member may be a main printed circuit board that operates the electronic device.

Consistent with still another aspect of the present invention, there is provided a mobile phone comprising: a front cover; a main printed circuit board installed on a rear surface of the front cover; a back cover coupled to the front cover and covering the main printed circuit board; and a hard disk drive assembly mounted between the main printed circuit board and the back cover, wherein the hard disk drive assembly comprises: a hard disk drive including a base member, a cover member, a spindle motor installed on the base member, at least one data storage disk mounted on the spindle motor, and an actuator pivotably installed on the base member and moving a read/write head to a predetermined position on the disk; and a printed circuit board disposed on the main printed circuit board to be placed beside the hard disk drive and operating the hard disk drive, wherein the hard disk drive is mounted between the main printed circuit board and the back cover using a first damping pad interposed between the cover member and the main printed circuit board and a second damping pad interposed between the base member and the back cover.

A cover plate may be attached to the back cover to cover the through-hole. The cover plate may be a metal sheet. The cover plate may be spaced a predetermined distance from the protrusions formed on the base member.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. The same elements are given the same reference numerals throughout the drawings.

Figure 5:
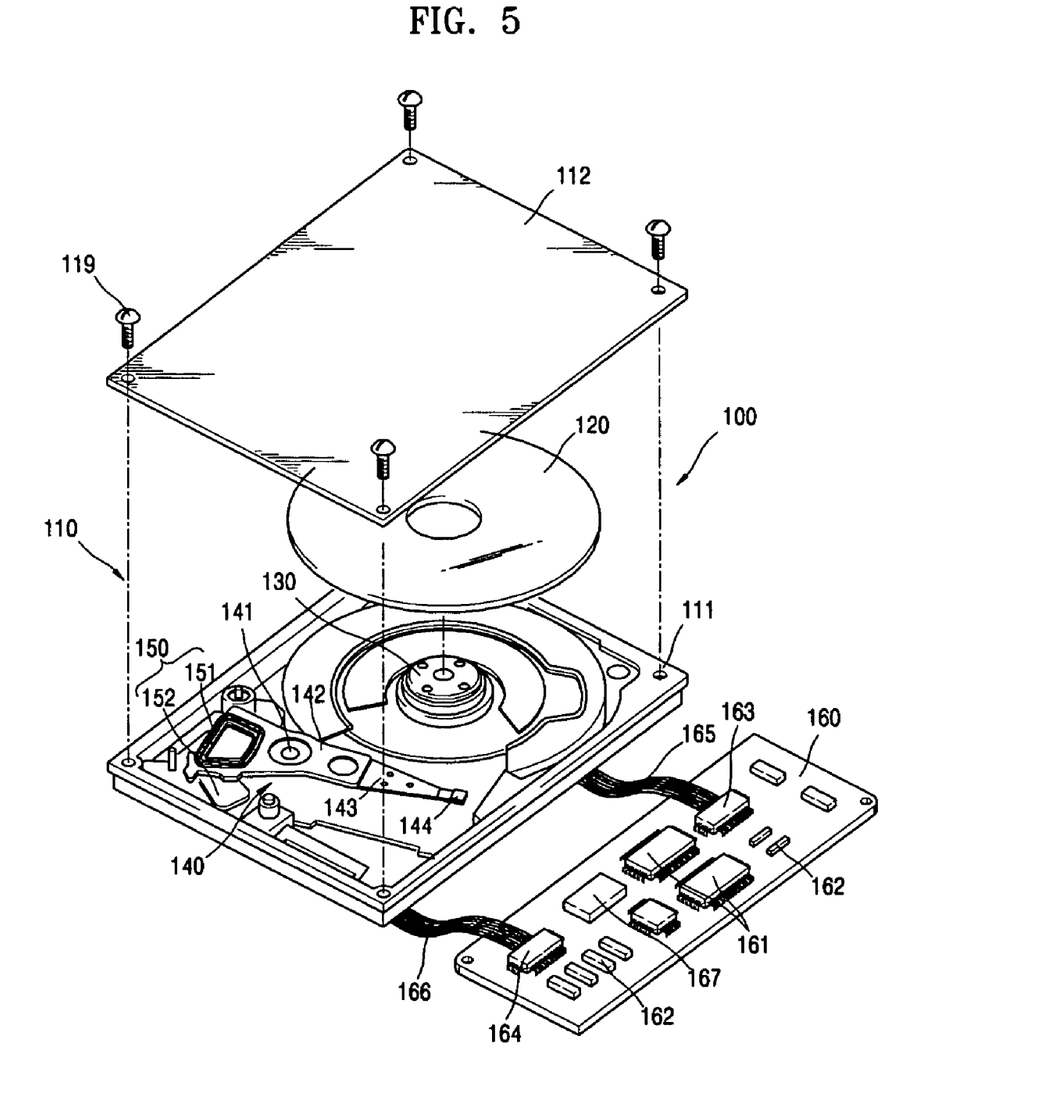
FIG. 5 is an exploded perspective view of a small HDD assembly consistent with an exemplary embodiment of the present invention.

FIG. 5 is an exploded perspective view of a small hard disk drive (HDD) assembly consistent with an exemplary embodiment of the present invention.

Referring to FIG. 5, a HDD assembly 100 includes a HDD 110, which is an information storage device, and a printed circuit board (PCB) 160, which operates the HDD 110.

The HDD 110 includes a base member 111, and a cover member 112 coupled to the base member 111 using a plurality of screws 119. A spindle motor 130 is installed on the base member 111, and at least one data storage disk 120 is mounted on the spindle motor 130. An actuator 140 is installed on the base member 111 to move a read/write head 144 to a desired position on the disk 120.

The actuator 140 includes a swing arm 142 rotatably coupled to an actuator pivot 141 that is installed on the base member 111, and a suspension 143 installed on one end portion of the swing arm 142 and elastically biases the read/write head 144 toward a surface of the disk 120. A voice coil motor (VCM) 150 is provided on the actuator 140 to rotate the swing arm 142. The VCM 150 includes a VCM coil 151 coupled to the other end portion of the swing arm 142, and a magnet 152 facing the VCM coil 151. The VCM 150 is controlled by a servo control system, and rotates the swing arm 142 in a direction according to Fleming's Left Hand Rule due to an interaction between current input to the VCM coil 151 and a magnetic field formed by the magnet 152. That is, if the HDD 110 is turned on and the disk 120 begins to rotate, the VCM 150 rotates the swing arm 142 counterclockwise to move the read/write head 144 over a recording surface of the disk 120. In contrast, if the HDD 110 is turned off and the disk 120 stops rotating, the VCM 150 rotates the swing arm 142 clockwise to remove the read/write head 144 from the disk 120.

The PCB 160 operates the spindle motor 130 and the actuator 140 of the HDD 110, and supports thereon a plurality of semiconductor chips 161 and various circuit elements 162.

In the HDD assembly 100 consistent with an exemplary embodiment of the present invention, the PCB 160 is disposed beside the HDD 110, not under the base member 111. Specifically, the PCB 160 may be disposed on the same plane as the HDD 110.

The PCB 160 is electrically connected to the HDD 110. To this end, two flexible printed circuits (FPCs) 165 and 166 may be used. Specifically, one ends of the two FPCs 165 and 166 are respectively connected to the spindle motor 130 and the actuator 140 of the HDD 110. The other ends of the two FPCs are respectively connected to two FPC connectors 163 and 164 provided on the PCB 160.

The HDD assembly 100 constructed as above can be mounted on a portable electronic device, such as a mobile phone, a personal digital assistant (PDA), a camcorder, and an MPA3 player. In this case, connecting means for electrically connecting the PCB 160 to the electronic device is required. Various well-known means may be used as the electrically connecting means. For example, the PCB 160 may be electrically connected to the electronic device using a mating socket 167 that is provided on the PCB 160. Another FPC instead of the mating socket 167 may also be used as the electrically connecting means.

Figure 6:
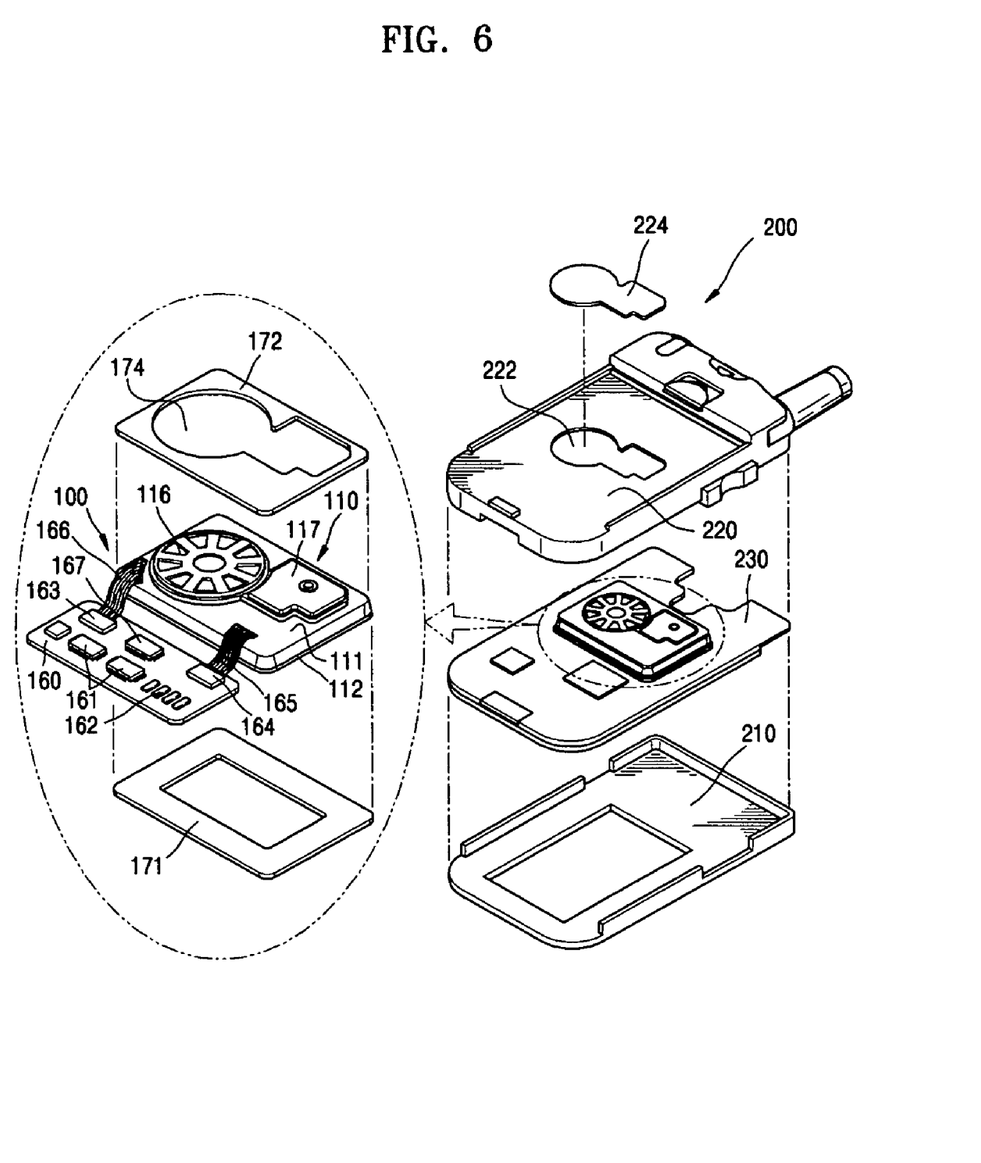
FIG. 6 is an exploded perspective view of a mobile phone on which a HDD of the HDD assembly shown in FIG. 5 is mounted.
Figure 7:
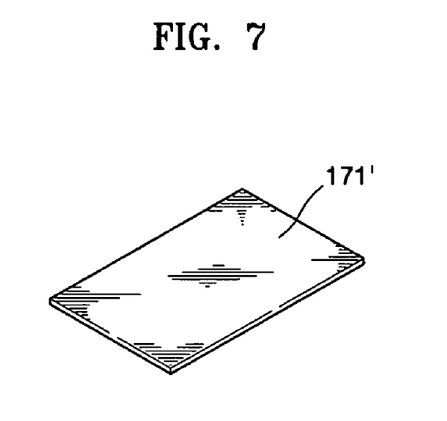
FIG. 7 is a perspective view illustrating a modified example of a first damping pad shown in FIG. 6.
Figure 8:
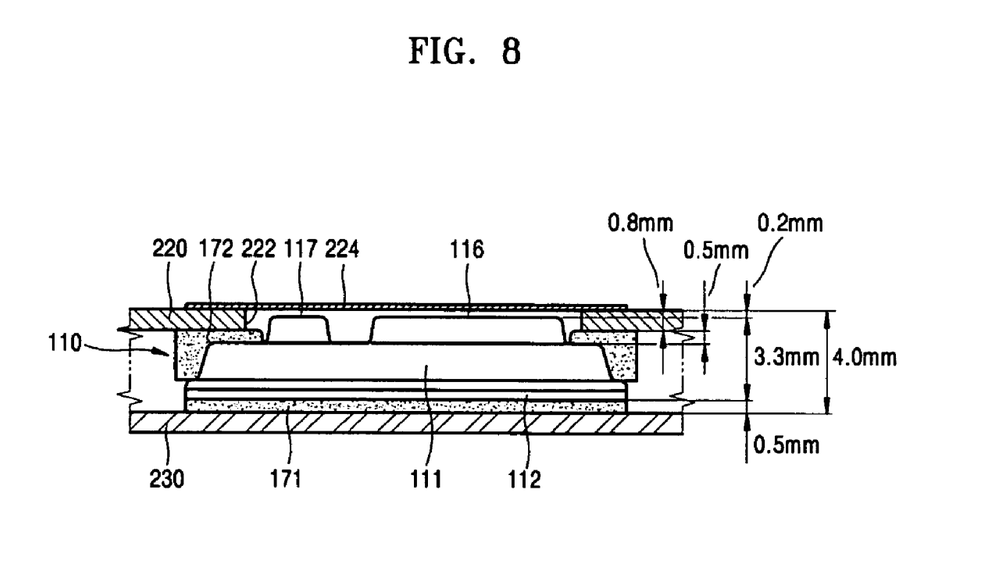
FIG. 8 is a vertical sectional view of the mobile phone on which the HDD assembly shown in FIG. 5 is mounted.

FIG. 6 is an exploded perspective view of a mobile phone on which the HDD assembly shown in FIG. 5 is mounted. FIG. 7 is a perspective view illustrating a modified example of a first damping pad shown in FIG. 6. FIG. 8 is a vertical sectional view of the mobile phone on which the HDD assembly shown in FIG. 5 is mounted. While the HDD assembly consistent with an exemplary embodiment of the present invention can be mounted on various kinds of portable electronic devices, a case where the HDD assembly is mounted on a mobile phone will now be exemplarily explained.

Referring to FIG. 6, a mobile phone 200 includes a front cover 210, a main PCB 230 installed on a rear surface of the front cover 210 and operating the mobile phone 200, and a back cover 220 coupled to the front cover 210 and covering the main PCB 230. The main PCB 230 and the back cover 220 face each other, and a predetermined space is formed therebetween.

The HDD assembly 100 consistent with an exemplary embodiment of the present invention is installed between the main PCB 230 and the back cover 220. Here, for the purpose of preventing shocks applied to the mobile phone 200 from being directly transferred to the HDD 110, a first damping pad 171 is inserted between the HDD 110 and the main PCB 230, and a second damping pad 172 is inserted between the HDD 110 and the back cover 220.

The first damping pad 171 is disposed between the cover member 112 of the HDD 110 and the main PCB 230. The first damping pad 171 may have a substantially rectangular frame shape contacting edges of the cover member 112, as shown in FIG. 6. Both surfaces of the first damping pad 171 may be respectively attached to the cover member 112 and the main PCB 230 using a predetermined adhesive.

In the meanwhile, the first damping pad 171 may have various shapes as well as the rectangular frame shape. For example, referring to FIG. 7, a first damping pad 171' interposed between the cover member 112 of the HDD 110 and the main PCB 230 may have a substantially rectangular plate shape contacting the overall surface of the cover member 112.

Referring to FIGS. 6 and 8, the first damping pad 171 absorbs and reduces external shocks or vibrations transferred to the HDD 110 through the main PCB 230. To this end, the first damping pad 171 may be made of viscoelastic material having a high shock or vibration absorbency, for example, rubber or engineering plastic having a predetermined elasticity.

The second damping pad 172 is interposed between the base member 111 of the HDD 110 and the back cover 220. The second damping pad 172 absorbs and reduces external shocks or vibrations transferred to the HDD 110 through the back cover 220. To this end, the second damping pad 172 may be made of viscoelastic material as previously mentioned.

On the other hand, protrusions, such as a motor support portion for supporting the spindle motor 130, and a pivot support portion 117 for supporting the actuator pivot 141, protrude a predetermined height from the base member 111.

The second damping pad 172 contacts a surface of the base member 111 other than the protrusions, that is, the motor support portion 116 and the pivot support portion 117, formed on the base member 111. To this end, the second damping pad 172 has a through-hole 174 corresponding in shape to the motor support portion 116 and the pivot support portion 117 such that the motor support portion 116 and the pivot support portion 117 are inserted into the through-hole 174. In this construction, a thickness increment of the mobile phone 200 due to the second damping pad 172 does not occur.

In an exemplary embodiment, a surface of the second damping pad 172 contacting the surface of the base member 111 conforms with the curved surface of the base member 111. In this instance, a contact area between the second damping pad 172 and the base member 111 increases, thereby enhancing the shock or vibration absorbency of the second damping pad 172.

The back cover 220 may also have a through-hole 222 into which the motor support portion 116 and the pivot support portion 117 of the base member 111 are inserted. In this construction, the thickness of the mobile phone 200 adopting the HDD 110 decreases further, which will be explained later.

As described above, when the back cover 220 has the through-hole 222 formed therein, a cover plate 224 may be attached to the back cover 220 to cover the through-hole 222. The cover plate 224 prevents foreign substances, such as dust, from intruding into the mobile phone 200, and also protects the HDD 110. The cover plate 224 is as thin as possible so as not to affect the thickness of the mobile phone 200, but still have a stiffness great enough to resist warpage. To this end, a metal sheet with a thickness of approximately 0.2 mm, for example, a stainless steel plate or an aluminium plate, may be used as the cover plate 224.

The cover plate 224 is spaced a predetermined distance from the protrusions, that is, the motor support portion 116 and the pivot support portion 117, protruding from the base member 111. The coverplate 224 is spaced a predetermined distance from the protrusions so that when the HDD 110 vibrates due to external shocks, the protrusions 116 and 117 can be prevented from colliding with the cover plate 224, which will be explained later in detail.

The PCB 160 for the HDD 110 is disposed beside the HDD 110 as mentioned above. Specifically, both the PCB 160 and the HDD 110 are disposed on the main PCB 230. The PCB 160 may be electrically connected to the HDD 110 using the FPCs 165 and 166. Further, the mating socket 167 may be provided on the PCB 160 to electrically connect the PCB 160 to the main PCB 230 of the mobile phone 200.

According to the mounting structure of the HDD 110, a thickness increment of the electronic device, for example, the mobile phone 200, on which the HDD 110 is mounted, can be minimized. This will be next explained in detail with reference to FIG. 8.

Referring to FIG. 8, for example, when the 0.85-inch diameter HDD 110 is mounted on the mobile phone 200, the thickness of the HDD 110 is 3.3 mm and the thickness of each of the first and second damping pads 171 and 172 is 0.5 mm.

Since the PCB 160 is disposed beside the HDD 110 and the second damping pad 172 contacts the surface of the base member 111, other than the motor support portion 116 and the pivot support portion 117 protruding from the base member 111, the PCB 160 and the second damping pad 172 do not increase the thickness of the mobile phone 200. The sum of the thickness of the first damping pad 171 and the thickness of the HDD 110 is approximately 3.8 mm.

When the back cover 220 has the through-hole 222, the motor support portion 116 and the pivot support portion 117 of the base member 111 can be inserted into the through-hole 222. In this exemplary embodiment, there is a distance of approximately 0.2 mm between the cover plate 224 attached to the back cover 220 and the protrusions 116 and 117 of the base member 111. When the second damping pad 172 interposed between the back cover 220 and the base member 111 has a shrinkage of approximately 30%, the second damping pad 172 shrinks about 0.15 mm if shocks are applied to the second damping pad 172. Accordingly, if there is the distance of approximately 0.2 mm between the cover plate 224 and the protrusions 116 and 117 of the base member 111, collision therebetween can be prevented sufficiently.

As a result, the thickness between the main PCB 230 and the cover plate 224, that is, the sum of the thickness of the first damping pad 171, the thickness of the HDD 110, and the interval between the cover plate 224 and the protrusions 116 and 117, is approximately 4.0 mm. Consequently, the thickness of the mobile phone 200 on which the small HDD 110 is mounted consistent with the present invention is smaller than the counterpart according to the conventional art.

Also, since the PCB 160 is disposed beside the HDD 110, not under the base member 111, the motor support portion 116 is not limited in diameter by the semiconductor chips 162 and the circuit elements 164 mounted on the PCB 160. Therefore, the motor support portion 116 is permitted to have a sufficiently high diameter, and thus, the HDD 110 can employ a higher spindle motor than a conventional one.

For example, the 0.85-inch diameter HDD can employ a spindle motor 130 with a diameter of φ19 mm. The large spindle motor 130 has advantages of a relatively high rotational stiffness Kt of approximately 1.4 and a relatively low power consumption of approximately 44 mW. In addition, the large spindle motor 130 can be started at a low temperature, for example, at a temperature of −15°.

As described above, keeping pace with the trend of lighter, thinner, and smaller portable electronic devices, the portable electronic device, such as, the mobile phone, employing the small HDD consistent with the present invention is thin.

Additionally, since the larger spindle motor can be employed in the HDD, merits of high rotational stiffness, low power consumption, and improved start-up at a low temperature can be obtained.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A mobile phone comprising:
   a front cover;
   a main printed circuit board installed on a rear surface of the front cover;
   a back cover coupled to the front cover and covering the main printed circuit board; and
   a hard disk drive assembly mounted between the main printed circuit board and the back cover,
   wherein the hard disk drive assembly comprises:
      a hard disk drive comprising:
         a base member,
         a cover member,
         a spindle motor installed on the base member,
         at least one data storage disk mounted on the spindle motor, and
         an actuator pivotably installed on the base member and moving a read/write head to a predetermined position on the disk, and
      a printed circuit board disposed on the main printed circuit board to be placed beside the hard disk drive and operating the hard disk drive,
      wherein the hard disk drive is mounted between the main printed circuit board and the back cover using a first damping pad interposed between the cover member and the main printed circuit board and a second damping pad interposed between the base member and the back cover, and
   wherein the back cover has a through-hole into which protrusion formed on the base member are inserted and a cover plate is attached to the back cover to cover the through-hole.

2. The mobile phone of claim 1, wherein the first damping pad has a substantially rectangular frame shape contacting edges of the cover member of the hard disk drive.

3. The mobile phone of claim 1, wherein the first damping pad has a substantially rectangular plate shape contacting the overall surface of the cover member of the hard disk drive.

4. The mobile phone of claim 1, wherein the second damping pad contacts a surface of the base member other than the protrusions formed on the base member.

5. The mobile phone of claim 4, wherein a surface of the second damping pad contacting the surface of the base member conforms with a curved surface of the base member.

6. The mobile phone of claim 4, wherein the protrusions comprise:
   a motor support portion, which supports the spindle motor of the hard disk drive; and
   a pivot support portion, which supports an actuator pivot.

7. The mobile phone of claim 1, wherein the first damping pad and the second damping pad are made of viscoelastic material.

8. The mobile phone of claim 1, wherein the printed circuit board is electrically connected to the hard disk drive using at least one flexible printed circuit.

9. The mobile phone of claim 1, wherein the printed circuit board supports a mating socket that electrically connects the printed circuit board to the main printed circuit board.

10. The mobile phone of claim 1, wherein the cover plate is a metal sheet.

11. The mobile phone of claim 1, wherein the cover plate is spaced a predetermined distance from the protrusions formed on the base member.

* * * * *